United States Patent [19]
Hackett et al.

[11] Patent Number: 5,760,363
[45] Date of Patent: Jun. 2, 1998

[54] APPARATUS AND METHOD FOR STARTING AND STOPPING A PLASMA ARC TORCH USED FOR MECHANIZED CUTTING AND MARKING APPLICATIONS

[75] Inventors: Elizabeth B. Hackett; Timothy M. Brewer, both of Lebanon; Zhipeng Lu; Richard W. Couch, Jr., both of Hanover, all of N.H.

[73] Assignee: Hypertherm, Inc., Hanover, N.H.

[21] Appl. No.: 707,227

[22] Filed: Sep. 3, 1996

[51] Int. Cl.$^6$ ..................... B23K 10/00
[52] U.S. Cl. ............... 219/121.44; 219/121.59; 219/121.55; 219/121.51
[58] Field of Search ............ 219/121.52, 121.39, 219/121.44, 121.59, 121.54, 121.57, 121.55, 75

[56] References Cited

U.S. PATENT DOCUMENTS

| | | | |
|---|---|---|---|
| 3,242,305 | 3/1966 | Kane et al. | 219/75 |
| 3,800,983 | 4/1974 | Brichard et al. | 219/75 |
| 4,649,257 | 3/1987 | Yakovlevitch et al. | 219/121 |
| 4,743,734 | 5/1988 | Garlanov et al. | 219/121 |
| 4,762,977 | 8/1988 | Browning | 219/121.47 |
| 4,764,656 | 8/1988 | Browning | 219/121.44 |
| 4,780,591 | 10/1988 | Bernecki et al. | 219/121.52 |
| 4,861,962 | 8/1989 | Sanders et al. | 219/121.5 |
| 4,902,871 | 2/1990 | Sanders et al. | 219/121.49 |
| 4,918,283 | 4/1990 | Yamade et al. | 219/121.46 |
| 4,967,055 | 10/1990 | Raney et al. | 219/121.5 |
| 5,013,885 | 5/1991 | Carkhuff et al. | 219/121.5 |
| 5,017,752 | 5/1991 | Severance, Jr. et al. | 219/121.59 |
| 5,070,227 | 12/1991 | Luo et al. | 219/121.55 |
| 5,120,930 | 6/1992 | Sanders et al. | 219/121.5 |
| 5,132,512 | 7/1992 | Sanders et al. | 219/121.5 |
| 5,216,221 | 6/1993 | Carkhuff | 219/121.51 |
| 5,317,126 | 5/1994 | Couch, Jr. et al. | 219/121.51 |
| 5,393,952 | 2/1995 | Yamaguchi et al. | 219/121.5 |
| 5,591,357 | 1/1997 | Couch, Jr. et al. | 219/121.39 |

*Primary Examiner*—Mark H. Paschall
*Attorney, Agent, or Firm*—Testa, Hurwitz & Thibeault, LLP

[57] ABSTRACT

A plasma arc torch apparatus and method for cutting or marking a workpiece includes a torch having an electrode and a nozzle coupled to a power supply, and a plasma gas source coupled to a fluid line for delivering plasma gas to the torch. A flow restriction member is disposed in the fluid line adjacent the torch and causes the pressure of the plasma gas in the torch to gradually increase during start up thus creating a stable plasma arc. A three-way valve is disposed in the fluid line downstream of the flow restriction member and has an inlet, a torch outlet, and a vent outlet. The inlet is in fluid communication with the torch outlet for delivering plasma gas to the torch when the valve is in the open position, and the torch outlet is in fluid communication with the vent outlet when the valve is in the vent position, for rapidly dissipating the gas in the plasma chamber of the torch to atmosphere after the arc has been extinguished. The rapid reduction of the gas pressure in the torch reduces the cycle time, enabling the torch to be restarted more quickly after completion of a prior cutting cycle.

20 Claims, 10 Drawing Sheets

APPARATUS AND METHOD FOR STARTING AND STOPPING A PLASMA ARC TORCH USED FOR MECHANIZED CUTTING AND MARKING APPLICATIONS

FIELD OF THE INVENTION

This invention relates to plasma arc torches used for cutting and marking metallic workpieces. In particular, this invention relates to a plasma arc torch having gas flow regulation components for forming a stable plasma arc and reducing cycle time for mechanized cutting and marking applications.

BACKGROUND OF THE INVENTION

Plasma arc torches are widely used in the cutting of metallic materials. A plasma arc torch generally includes a torch body, an electrode mounted within the body, a nozzle with a central exit orifice, electrical connections, passages for cooling, a swirl ring to control the fluid flow patterns, and a power supply. The torch produces a plasma arc, which is a constricted ionized jet of a plasma gas with high temperature and high momentum. Gases used in the torch can be non-reactive (e.g. argon or nitrogen), or reactive (e.g. oxygen or air).

In operation, a pilot arc is first generated between the electrode (cathode) and the nozzle (anode). The pilot arc ionizes gas passing through the nozzle exit orifice. After the ionized gas reduces the electrical resistance between the electrode and the workpiece, the arc transfers from the nozzle to the workpiece. The torch is operated in this transferred plasma arc mode, which is characterized by the conductive flow of ionized gas from the electrode to the workpiece, for the cutting of the workpiece.

Generally, there are two widely used techniques for generating a plasma arc. One technique uses a high frequency, high voltage (HFHV) signal coupled to a DC power supply and the torch. The HFHV signal is typically provided by a generator associated with the power supply. The HFHV signal induces a spark discharge in the plasma gas flowing between the electrode and a nozzle, and this discharge provides a current path. The pilot arc is thus formed between the electrode and the nozzle with the voltage existing across them.

The other technique for generating a plasma arc is known as contact starting. Contact starting is advantageous because it does not require high frequency equipment and, therefore, is less expensive and does not generate electromagnetic interference. In one form of contact starting, the electrode is manually placed into electrical connection with the workpiece. A current is then passed from the electrode to the workpiece and the arc is struck by manually backing the cathode away from the workpiece. Another form of contact starting can be found in U.S. Pat. Nos. 4,791,268 and 4,902,871, assigned to Hypertherm, Inc., which are incorporated herein by reference. A movable electrode and a stationary nozzle are initially in contact due to a spring coupled to the electrode such that the nozzle orifice is blocked. To start the torch, a current is passed from the electrode to the nozzle and a plasma gas is supplied to a plasma chamber defined by the electrode, the nozzle and the swirl ring. Contact starting is achieved when the buildup of gas pressure in the plasma chamber overcomes the spring force, thereby separating the electrode from the nozzle and drawing a pilot arc therebetween.

For both of the techniques described above, the pressure of the plasma gas in the torch should rise gradually during the start process to reliably form and maintain a stable plasma arc. If the pressure of the plasma gas in the torch rises rapidly, the plasma arc (1) may not form, or (2) may form, become unstable and extinguish. Known plasma arc torch systems typically rely on long fluid lines between the plasma gas source and the torch to deliver plasma gas that gradually rises in pressure during the start process. For example, certain plasma arc torch systems which include an X-Y cutting table require long fluid lengths to allow the gantry on which the torch is mounted to move across the entire table. However, in certain mechanized applications, long fluid lines may not be desirable. For example, shorter fluid lengths are desirable for plasma arc torch systems which utilize a robotic arm to move the torch.

In mechanized applications, it is also important that the plasma gas flowing through the torch be dissipated relatively quickly after the plasma arc is extinguished so that the torch can be immediately restarted. However, the pressure of the plasma gas in the torch must fall below a certain threshold level before the torch can be restarted. If an attempt is made to restart the torch before the plasma gas pressure has fallen below the threshold, a stable plasma arc cannot be generated. A known method of dissipating the gases in the torch involves dissipating the gases through the nozzle orifice. Often dissipation takes at least two seconds, which can be undesirable for intricate mechanized cutting operations requiring multiple start cycles.

It is therefore a principle of object of this invention to provide plasma gas to a plasma arc torch such that the pressure in the torch rises at a gradual rate, without relying on the length of the fluid lines to achieve that rate. It is another object of this invention to dissipate the plasma gas in the torch at a rapid rate after the plasma arc has been extinguished, without relying solely on the nozzle orifice to dissipate the gas.

SUMMARY OF THE INVENTION

The present invention features a plasma arc torch apparatus (and method) for plasma arc cutting and marking applications which generates and maintains a stable plasma arc during the starting process, and rapidly dissipates gases from the torch after the torch has been extinguished.

Plasma marking is achieved by generating a clearly visible mark on a metallic surface utilizing a plasma arc having carefully controlled energy. The mark can be temporary or permanent. A temporary mark is achieved by heat induced discoloration of the surface. The metallic surface is not melted with temporary marking. Thus, a temporary mark is lost during secondary operations (e.g. plating or sand-blasting). A permanent mark or score is achieved by melting and resolidifing the metallic surface along the mark. A permanent mark can be light (shallow, grooved and narrow) or heavy (deep and wide) depending on the application. Permanent marks are still visible after secondary operations (e.g. plating or sand-blasting). Dimpling or punching can also be achieved by applying a stationary plasma arc torch to a workpiece for a predetermined time period. Plasma dimpling or punching is also desired in some applications.

In one embodiment, the plasma arc torch apparatus for cutting or marking a workpiece includes a plasma arc torch having an electrode and a nozzle mounted at an end of the torch body. The torch receives electrical power from a power supply. A plasma gas source is coupled to the torch via a fluid line for delivering plasma gas to the torch. A flow restriction member is disposed in the fluid line and has an orifice defined therein. During the starting process (i.e., when the plasma gas initially begins to flow through the fluid line to the torch), the orifice restricts the flow such that only a small portion of the plasma gas flows into the torch at a time, resulting in a gradual increase in the pressure of the plasma gas in the torch. This gradual increase in pressure in the torch results in the formation of a stable plasma arc and allows the arc to remain stable as the flow of the plasma gas increases to operating pressure. To accomplish this, the flow restriction member defines an orifice having a diameter which is about one-sixth the internal diameter of the fluid line.

In another embodiment, the plasma arc torch apparatus for plasma arc cutting or marking rapidly dissipates the plasma gas from a plasma chamber, defined as the region between the electrode and nozzle, after the plasma arc is extinguished. To achieve this, the torch apparatus further comprises a three-way valve positioned in the fluid line. The three-way valve alternates between an open position and a vent position to regulate the flow of plasma gas to the torch. When the valve is in the open position, plasma gas is delivered from the source to the torch. When the valve is in the vent position, the plasma gas (and optionally a shield gas) is rapidly dissipated to atmosphere, thus reducing the restart cycle time. With this configuration, the torch can be re-started almost instantaneously (e.g., less than 100 milliseconds) after the torch has completed the prior cutting cycle. The three-way valve may comprise an electrically actuated solenoid valve.

The present invention is particularly advantageous when employed in contact start plasma torch systems. Mechanized applications can require short or extremely long fluid line lengths. However, contact start torch system require a fluid lines having lengths within a specified range to achieve a gradual increase in plasma gas pressure for reliable formation of a plasma arc. By utilizing the invention in a contact start torch system, the pressure in the torch rises at a gradual rate without relying on the length of the lead lines to achieve that rate. Thus, a contact start torch system incorporating the principles of the invention can be used with short and long lead lines in various mechanized applications.

The foregoing and other objects, features, and advantages of the invention will be come apparent from the following, more particular, description of the preferred embodiments of the invention, as illustrated in the accompanying drawings.

DETAILED DESCRIPTION

Figure 1:
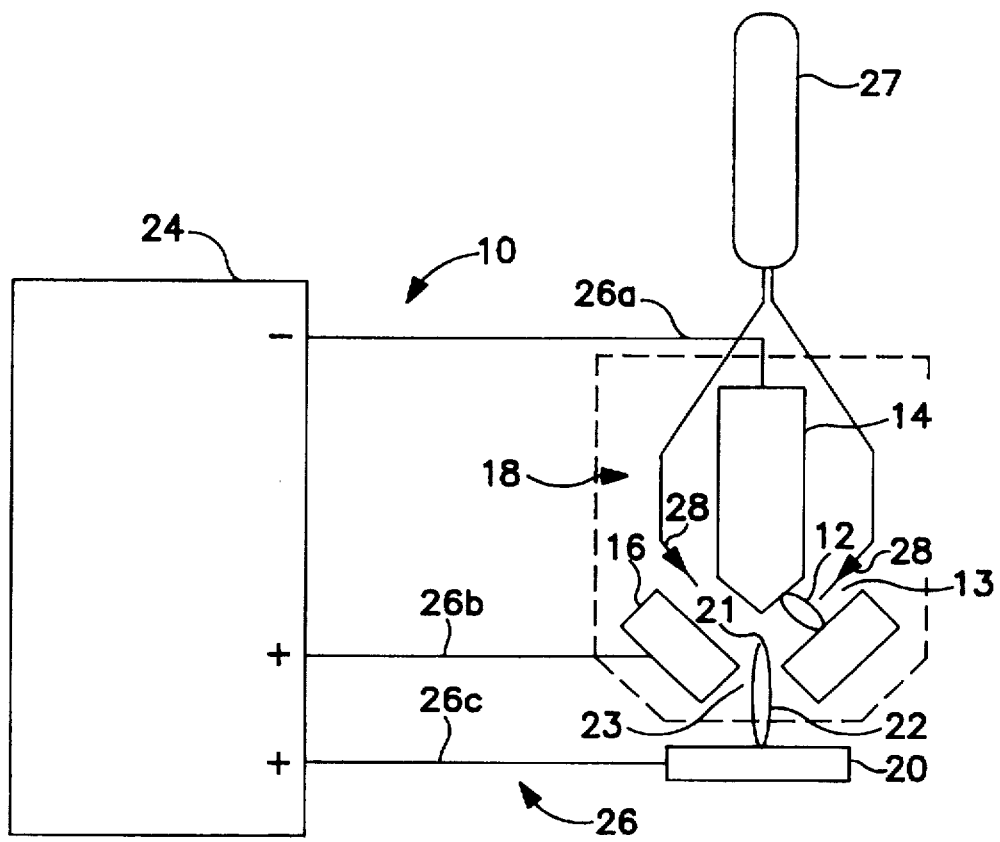
FIG. 1 is a highly simplified schematic diagram of a contact start plasma arc torch.

FIG. 1 illustrates a plasma arc torch 18 that can be utilized to practice the invention. A pilot arc 12 is first established in a plasma chamber 13, defined as the region between an electrode 14 and a nozzle 16, by utilizing one of the contact starting techniques described previously. A power supply 24 provides the electrical energy to the torch body and a gas source 27 provides a flow 28 of plasma gas to the plasma arc torch 18. Contact starting is achieved when the buildup of pressure of the gas (from the gas source 27) in the plasma chamber 13 overcomes the force which holds the nozzle 16 and electrode 14 in contact, thereby separating the electrode 14 from the nozzle 16 and forming the pilot arc 12. The nozzle 16 has a central passage 21 and an exit orifice 23 through which an arc can transfer to a workpiece 20.

The pilot arc 12 transfers to the workpiece 20 as a transferred arc 22. The transferred arc 22 has a higher current level than the pilot arc 12 and therefore can conduct significantly more energy to the metal workpiece 20 than the pilot arc 12. The energy in the transferred arc 22 can be utilized for marking or for cutting applications.

The power supply 24 provides the electrical energy for the pilot arc and transferred arc operation. An electrical lead set 26 has a negative lead 26a connected from the negative output terminal of the power supply to the electrode 14. Electrical leads 26b and 26c connect from positive output terminals of the power supply 24 to the nozzle 16 and workpiece 20, respectively.

The gas source 27 may comprise a number of gases including a mixture of hydrogen and an inert gas. The flow 28 of a plasma gas from a gas source 27 flows through the torch 18 and is ionized by the pilot arc 12. A larger voltage drop is applied across the electrode 14 and workpiece 20 (lead 26a to lead 26c) than across the electrode 14 and nozzle 16 (lead 26a to lead 26b) in order to induce the arc 12 to transfer to the workpiece 20 once the gas in the electrode-workpiece gap is ionized.

Figure 2:
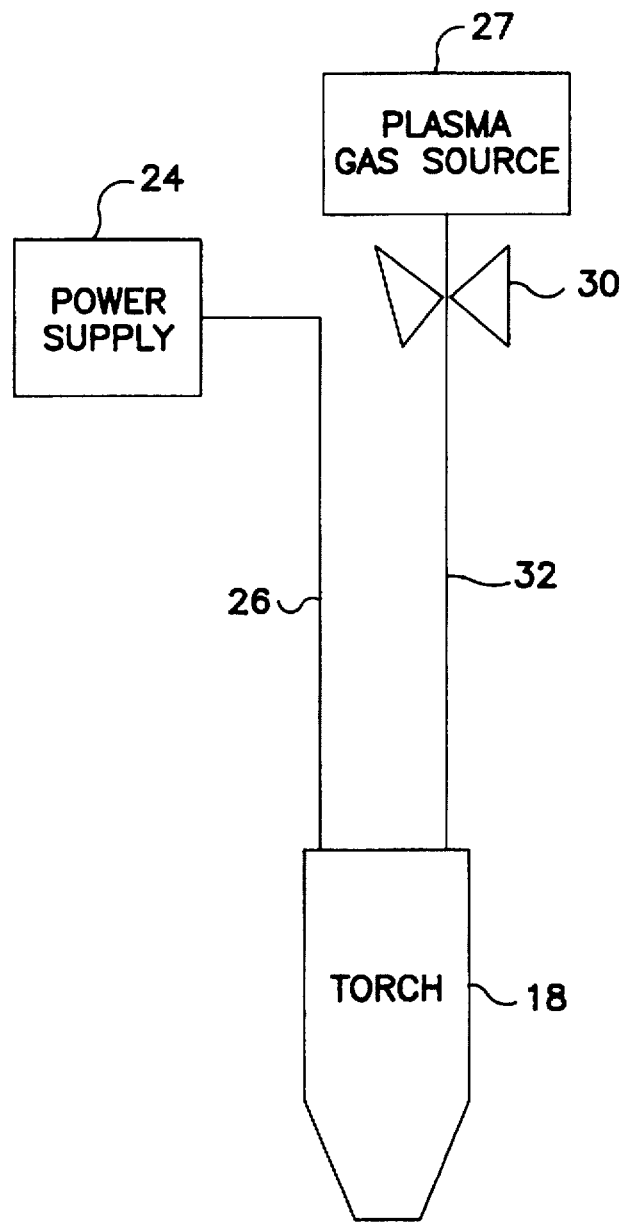
FIG. 2 is a schematic diagram of a conventional contact start plasma arc torch.

FIG. 2 shows a prior art plasma arc torch system. The torch 18 includes an electrode and nozzle (not shown) and is electrically coupled to a power supply 24 via electrical cables 26. A plasma gas source 27 is fluidly coupled with the torch 18 via hoses 32. A two-way valve 30 is disposed in the hose 32 and alternates between (1) an open position during which plasma gas freely flows through the valve 30 to the hose 32 and to the torch 18, and (2) a closed position during which no gas flows through the valve 30 to the hose 32 and the torch 18. The valve 30 is disposed in close proximity to the plasma source 27. The line 32 emanating from the valve is of sufficient length that plasma gas is delivered gradually to the torch 18 when the valve 30 is configured to the open position. As plasma gas flows to the torch 18, the gas pressure gradually reaches a certain pressure (typically in the range of 20–45 PSI) and a plasma arc is generated. To prevent the arc from becoming unstable or from being extinguished, the lead line must be at least 15 feet in length. Lengths shorter than 15 feet can cause the pressure in the torch to increase too quickly, causing the arc to be unstable or extinguishing the arc.

Figure 3A:
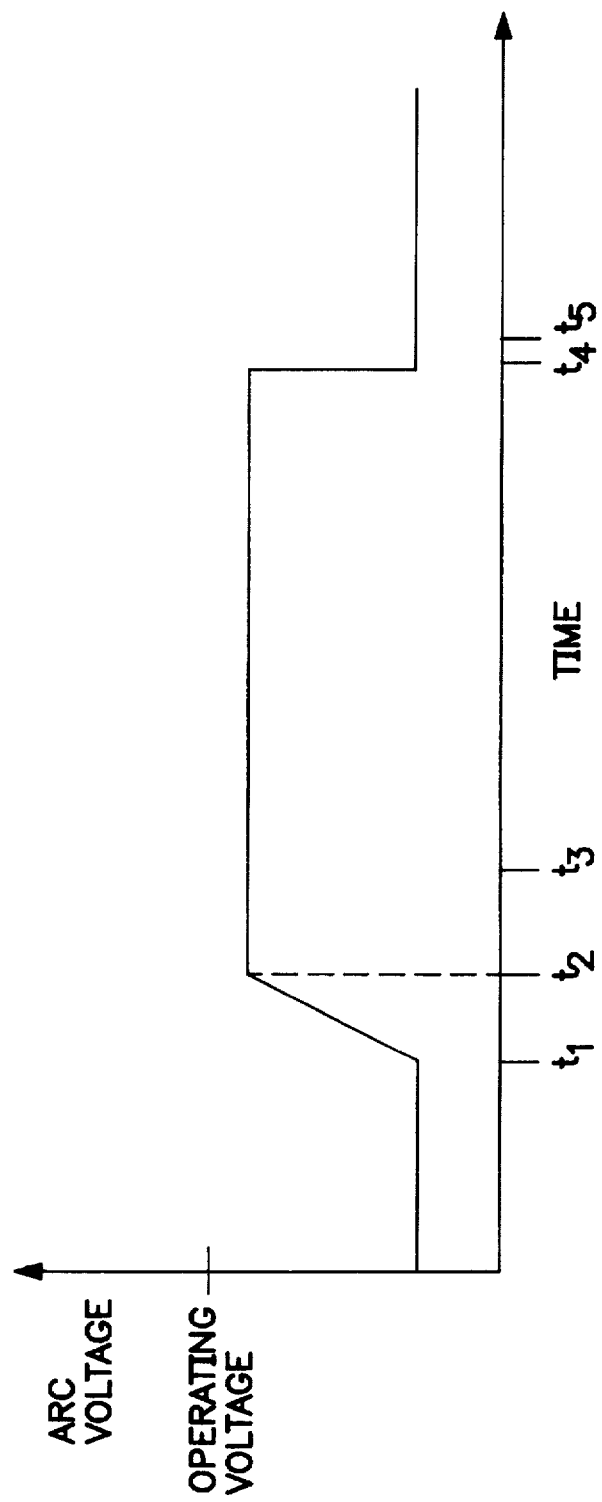
FIG. 3A is a graph showing the operating voltage of the plasma arc generated by the apparatus of FIG. 2 during an operating cycle.

FIG. 3A is a graph showing the voltage of the arc generated by the contact start-type plasma arc torch apparatus of FIG. 2 during an operating cycle. At time $t_1$ the torch 18 undergoes the starting process, as the power supply 24 delivers an electrical current to the torch 18. At this time, the valve 30 is configured to an open position and plasma gas flows through the lead line 32 from the plasma gas source 27. At time $t_2$, the plasma chamber pressure reaches a threshold causing the electrode and the nozzle to disengage and the arc voltage reaches an operating voltage. The voltage remains relatively constant until time $t_4$, when the arc is extinguished and the valve 30 is configured to the closed position. As neither current nor plasma gas is being delivered to the torch 18 at time $t_4$, the voltage drops to zero and the pressure in the plasma chamber starts to drop due to the loss of plasma gas through the nozzle orifice.

Figure 3B:
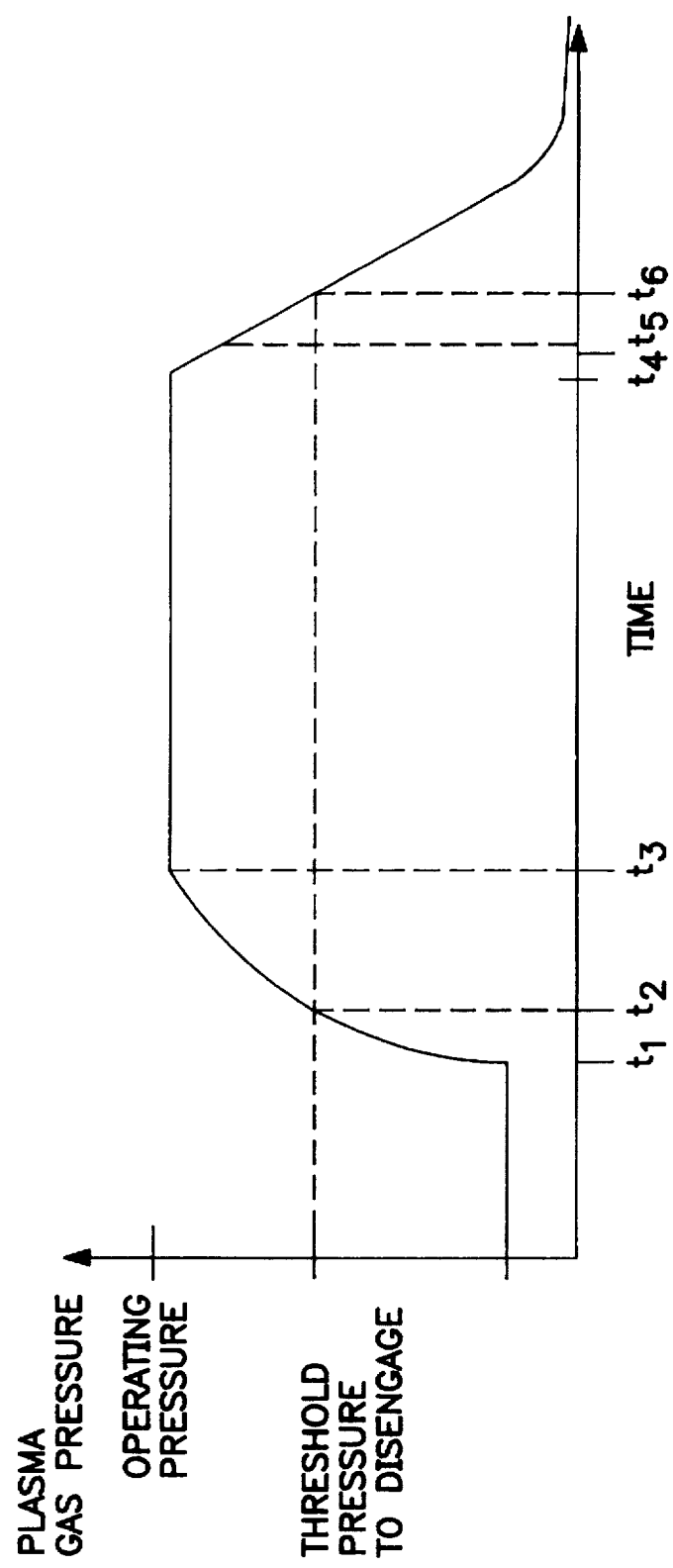
FIG. 3B is a graph showing the operating pressure of the plasma gas in the torch of the apparatus of FIG. 2 during an operating cycle.

FIG. 3B is a graph showing the plasma gas pressure in the torch of FIG. 2 during an operating cycle. At time $t_1$, the torch 18 is started, and plasma gas is delivered to the torch 18 through the hose 32 causing the pressure of the plasma gas in the plasma chamber 13 to increase. At time $t_2$, the pressure in the chamber 13 reaches the minimum pressure required to disengage the electrode from contact with the nozzle, which creates a gap, and causes a plasma arc to form. This time corresponds to the increase in the arc voltage to the operating voltage shown in the graph of FIG. 3A at time $t_2$. As the pressure in the plasma chamber continues to increase, the torch 18 reaches an operating pressure at time $t_3$. The operating pressure remains relatively constant for the remainder of the operating cycle. At time $t_4$, the arc is extinguished and the valve 30 is configured to the closed position. As neither current nor plasma gas is being delivered to the torch 18, the gases in the chamber 13 slowly dissipate through the nozzle orifice 23. Between times $t_4$ and $t_5$, the pressure in the chamber remains higher than the threshold pressure, thereby maintaining separation between the electrode and the nozzle. At $t_6$, the pressure falls below the threshold pressure required to maintain the gap between them, and electrode and nozzle re-engage. Typically, the amount of time (between times $t_4$ and $t_6$) to dissipate the plasma gas is at least 2 seconds.

Figure 4:
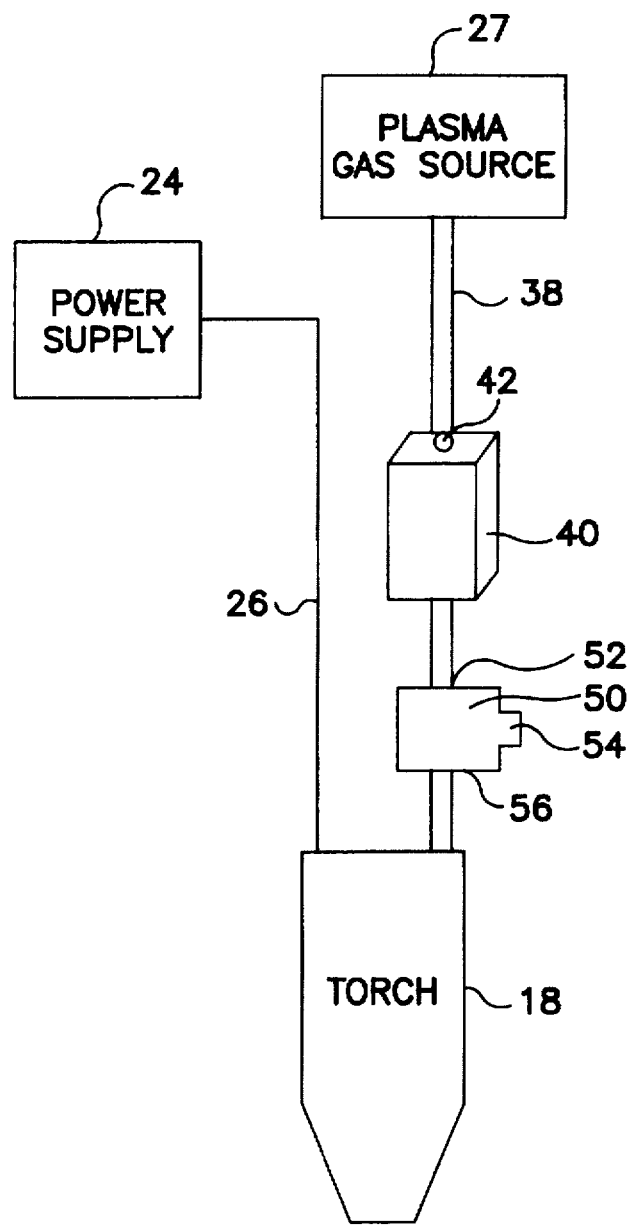
FIG. 4 is a schematic diagram of one embodiment of the plasma arc torch apparatus of the present invention.

FIG. 4 shows an embodiment of the plasma arc torch system of the present invention. The torch 18 generally includes an electrode and a nozzle which define a plasma chamber 13 (see FIG. 1), and is electrically coupled to a power supply 24 via electrical cable 26. In this embodiment, the plasma gas source 27 is in fluid communication with the torch 18 via a fluid line 38. A flow restriction member 40 is disposed in the fluid line 38. The member has an orifice 42 that is generally of a smaller diameter than the internal diameter (not shown) of the fluid line 38. A three-way valve 50 is positioned adjacent the torch and alternates between (1) an open position during which plasma gas flows through the fluid line 38 to the torch 18, and (2) a vent position during which gases from the torch dissipate through the valve 50 to the atmosphere.

Figure 5:
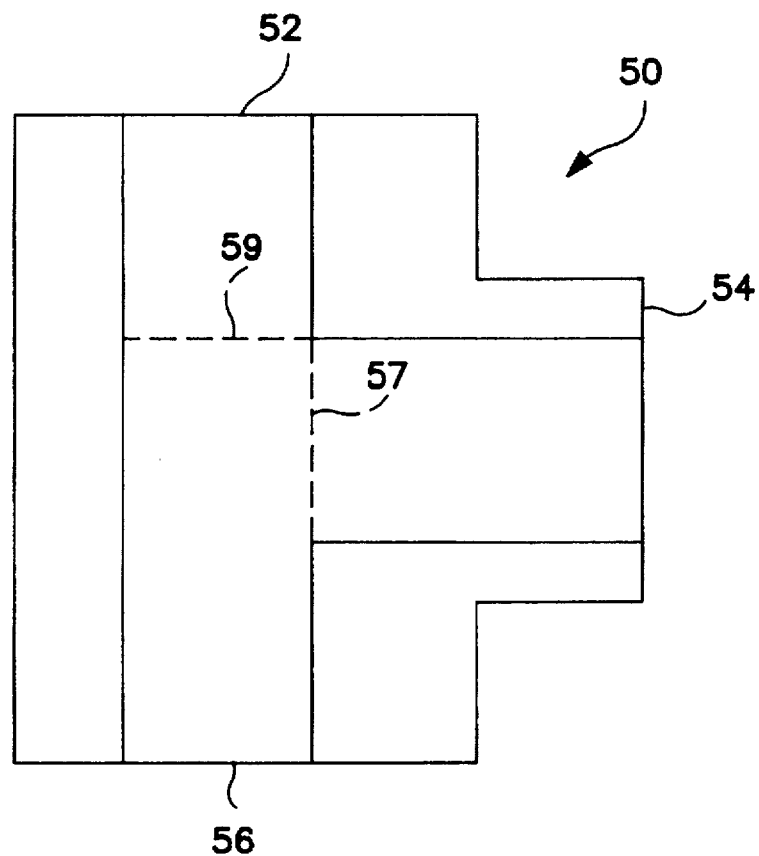
FIG. 5 is a schematic diagram of a three-way valve used in the plasma arc torch apparatus of the present invention.

Referring briefly to FIG. 5, the open position and the vent position of the three-way valve 50 are further described. As shown, the three-way valve 50 has an inlet 52 and a torch outlet 56. The inlet 52 and outlet 56 are fluidly coupled to the fluid line 38 of FIG. 4 when the valve 50 is in the open position. The open position is defined by the open passageway between the inlet 52 and the torch outlet 56, wherein the passageway includes a wall 57 (shown by the dotted lines) that blocks off vent outlet 54. The wall 57 can be created by a plunger, a ball or other blocking member. The three-way valve 50 has a vent outlet 54 that is in fluid communication with the atmosphere when the three-way valve 50 is in the vent position. The vent position is defined by the open passageway between the vent outlet 54 and the torch outlet 56, wherein the passageway includes a wall 59 (shown by the dotted lines) that blocks off the inlet 52. The wall 59 can be formed (as stated above) by a plunger, a ball or other blocking member sufficient to close off inlet 52. The three-way valve 50 is preferably an electromechanical valve, such as a solenoid valve.

Referring back to FIG. 4, the three-way valve 50 alternates between (1) an open position during which plasma gas freely flows through the inlet 52 of the valve 50 and the hose 38 to the torch 18, and (2) a vent position during which no gas flows through the inlet 52 and fluid line 38, but rather, gases flow from the plasma chamber 23 through torch outlet 56 of the valve 50, and through the vent outlet 54 to the atmosphere. Both the flow restriction member 40 and the valve 50 are disposed in close proximity to the torch 18, and the fluid line 38 emanating from the plasma source 27 is relatively short. Because the flow restriction member performs the function of delivering plasma gas gradually to the torch 18 when the valve 50 is configured to the open position during the starting process, the length of the fluid line 38 is not as important as in conventional systems. As plasma gas flows to the torch 18, the pressure of the gas gradually reaches a certain pressure, such that the electrode and the nozzle disengage, and a plasma arc is generated. The flow restriction member 40 thus performs the functions of ensuring the reliable formation of a stable arc and preventing the arc from being unstable or extinguished, without the need for a long lead line.

Figure 6A:
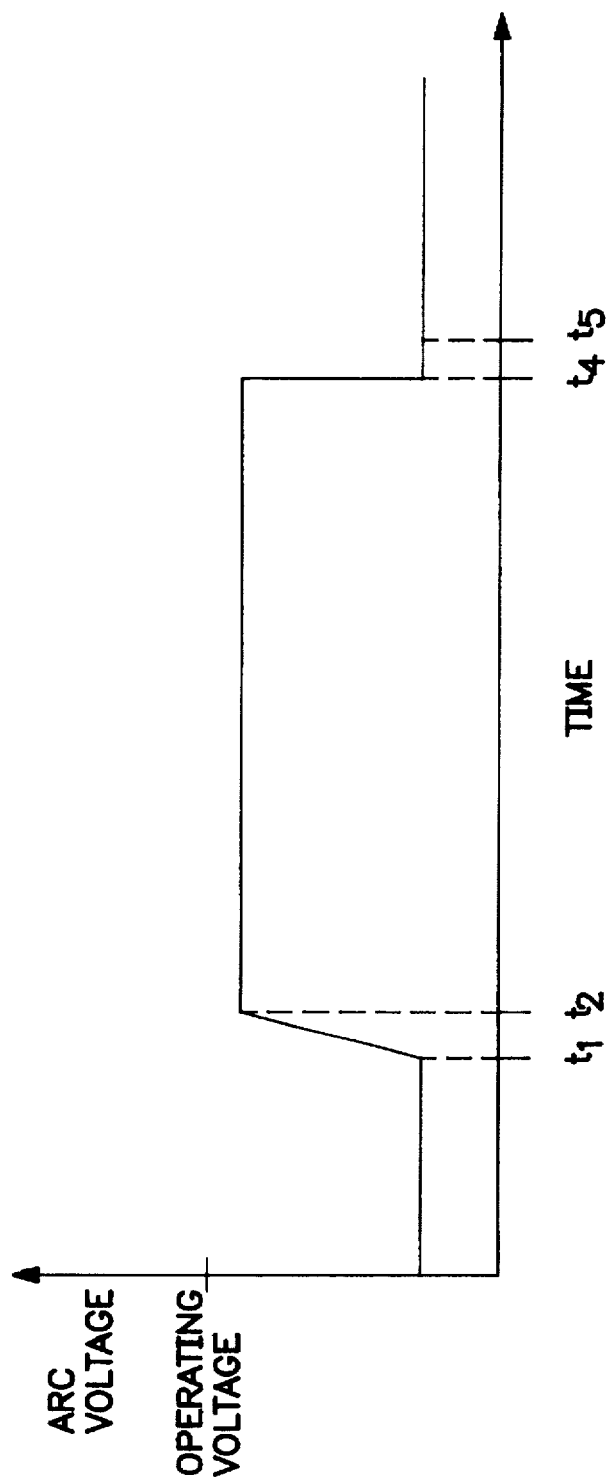
FIG. 6A is a graph showing the operating voltage of the plasma arc generated by the apparatus of FIG. 4 during an operating cycle.

FIG. 6A is a graph showing the voltage of the arc generated by the plasma arc torch apparatus of FIG. 4 during an operating cycle. At time $t_1$ the power supply 24 delivers an electrical current to the torch 18. The three-way valve 50 is configured to an open position such that the inlet 52 and the torch outlet 56 are placed in fluid communication with each other. Plasma gas flows from the plasma gas source 27 through the flow restriction member 40, where a controlled amount of the gas is permitted to flow through the orifice 42, to the valve inlet 52 over time. At time $t_2$, the pressure in the plasma chamber 13 reaches a threshold value. At that point, the electrode and the nozzle disengage, and the arc voltage reaches an operating voltage. The voltage remains relatively constant until time $t_4$ when the arc is extinguished. At such time, the valve 50 is configured to the vent position, such that the vent outlet 54 and the torch outlet 56 are in fluid communication. As neither current nor plasma gas is being delivered to the torch 18 at this time, the voltage drops to zero and the pressure in the plasma chamber starts to drop due to the loss of plasma gas through the nozzle orifice.

Figure 6B:
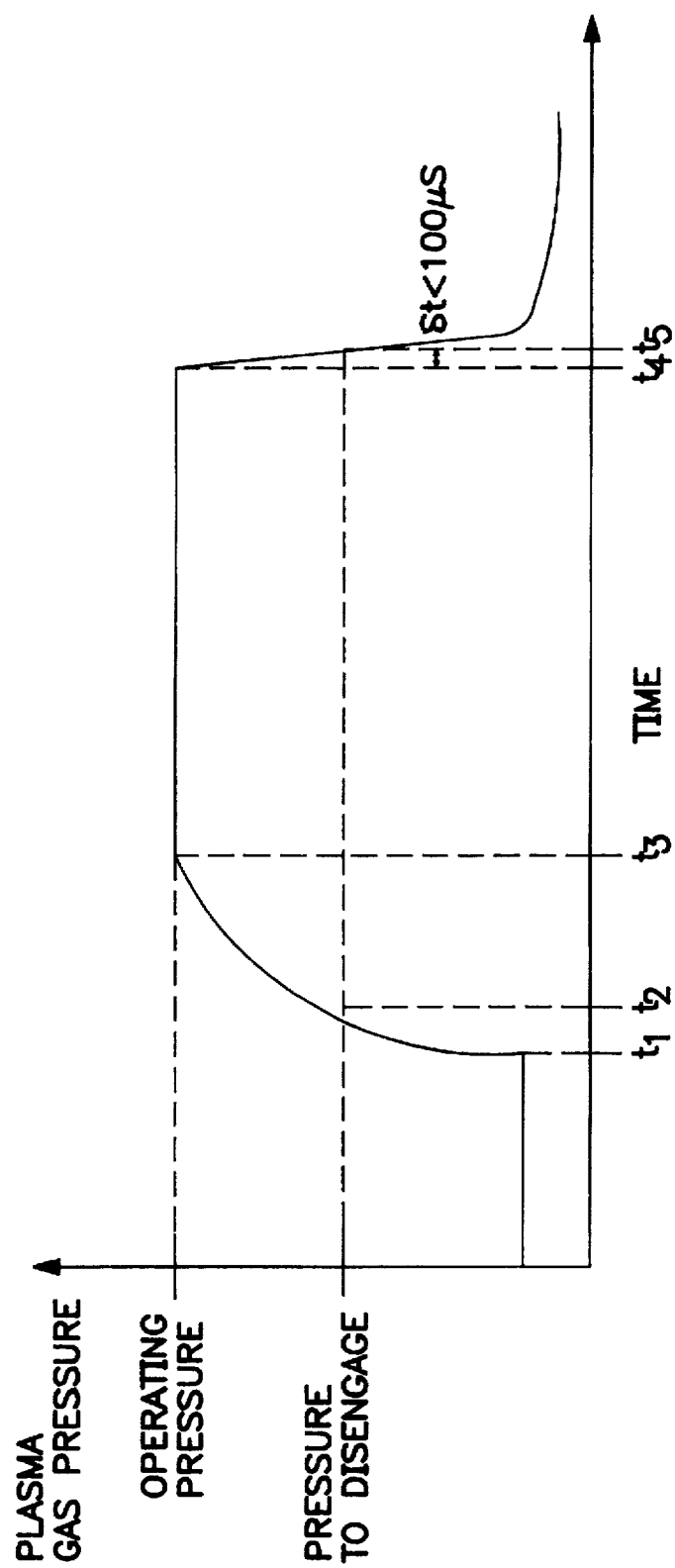
FIG. 6B is a graph showing the operating pressure of the plasma gas in the torch of the apparatus of FIG. 4 during an operating cycle.

FIG. 6B is a graph showing the pressure of the plasma gas within the plasma arc torch apparatus of FIG. 4 during an operating cycle. As stated above, at time $t_1$, the pressure of the plasma gas in the chamber 13 begins to increase gradually due to the flow restriction member 40. At time $t_2$, the pressure in the chamber 13 reaches the minimum pressure required to disengage the electrode from contact with the nozzle, causing a plasma arc to form. As the pressure continues to increase, the torch reaches operating pressure at time $t_3$. The operating pressure remains relatively constant during the operating cycle. At time $t_4$, the power supply 24 is shut off and the three-way valve 50 is configured in the vent position such that the torch outlet 56 and the vent outlet 54 are in fluid communication. As neither current nor plasma gas is being delivered to the torch 18, the arc is extinguished. With the three-way valve in the vent position, the pressure of the plasma gas in the torch 18 rapidly dissipates through the vent outlet between times $t_4$ and $t_5$. At time $t_5$, the electrode and nozzle return into contact, as the pressure of the gas is reduced a value below the threshold pressure required to disengage them. Typically, the amount of time (between times $t_4$ and $t_5$) to dissipate the gas is at significantly less than 2 seconds (e.g., about 100 milliseconds or less). At time $t_5$ the torch can be restarted.

Comparing FIGS. 3A and 6A, it is evident that the gradual pressure increases between times $t_1$ and $t_3$ are virtually identical, demonstrating the ability of the flow restriction member 40 to deliver plasma gas gradually to the torch 18 without the need for a long hose. Also, a comparison of FIGS. 3B and 6B, shows that the pressure dissipates from the torch 18 much more quickly after time $t_4$ in FIG. 6B, than as shown in FIG. 3B at time $t_4$. Thus, the rapid reduction in pressure exhibited by the apparatus of the present invention results in a dramatic reduction in the starting cycle time for the torch. Referring again to FIG. 6B, the torch can be restarted at time $t_5$ (e.g., in about 100 milliseconds) as the pressure in the torch 18 is reduced below the minimum pressure required to disengage the electrode from contacting the nozzle. At time $t_5$ in FIG. 3B, gas is still being dissipated through the nozzle and the gas pressure in the torch is too high to reliably restart the torch. As shown in FIG. 3B, a two second waiting period is required to restart the torch.

Figure 7:
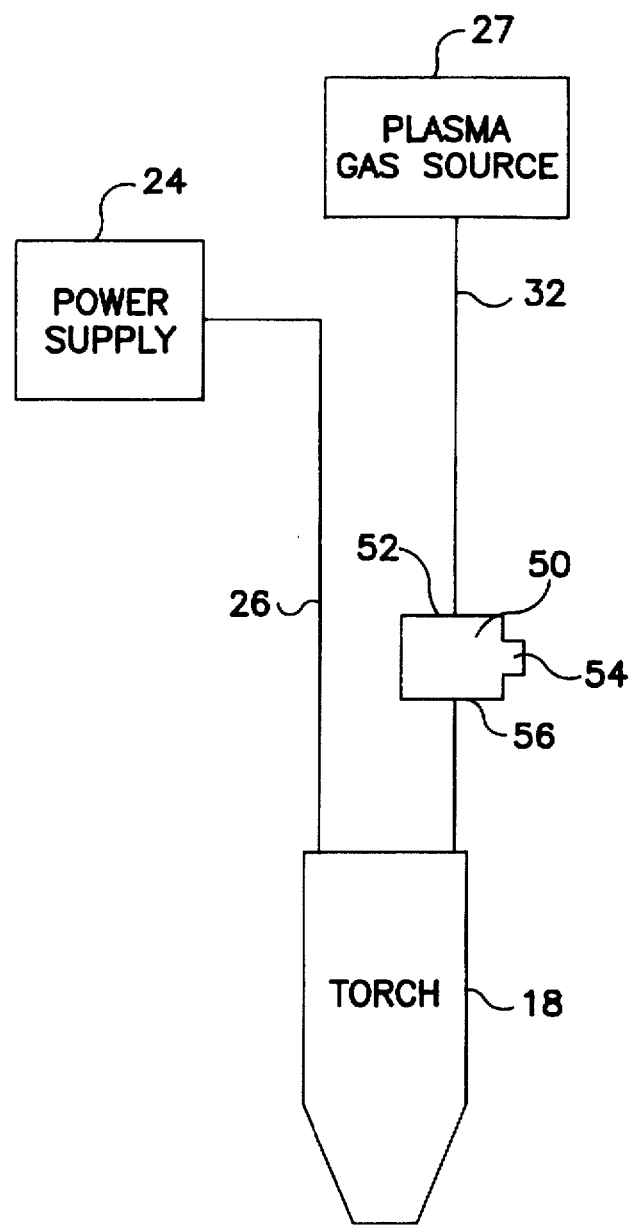
FIG. 7 is a schematic diagram of another embodiment of the plasma arc torch apparatus of the present invention.

FIG. 7 shows another embodiment of the plasma arc torch apparatus of the present invention. The torch 18 generally includes an electrode and a nozzle (not shown) as generally described above. The torch 18 is electrically coupled to a power supply 24 via electrical cable 26, and is fluidly coupled to the plasma gas source 27 via a hose 32. The hose 32 is preferably of sufficient length to provide a gradual increase in the gas pressure in the torch during startup, as similarly described in FIG. 2. Disposed in the hose 32 is a three-way valve 50, which alternates between an open position during which plasma gas flows through the lead line 32 to the torch 18, and a vent position during which gases from the torch 18 to dissipate through the valve 50 to the atmosphere.

In the embodiment of FIG. 7, the voltage and pressure curves are substantially similar to the graphs of FIG. 6A and FIG. 6B, as the hose 32 provides a gradual increase in the pressure in the torch 18 between times $t_1$ and $t_3$, and the three-way valve 50 provides a rapid dissipation of gases from the torch 18 between times $t_4$ and $t_5$. This embodiment can be used where lead length is not a critical design consideration, and thus, longer lead lines are easily accommodated or even desirable.

Figure 8:
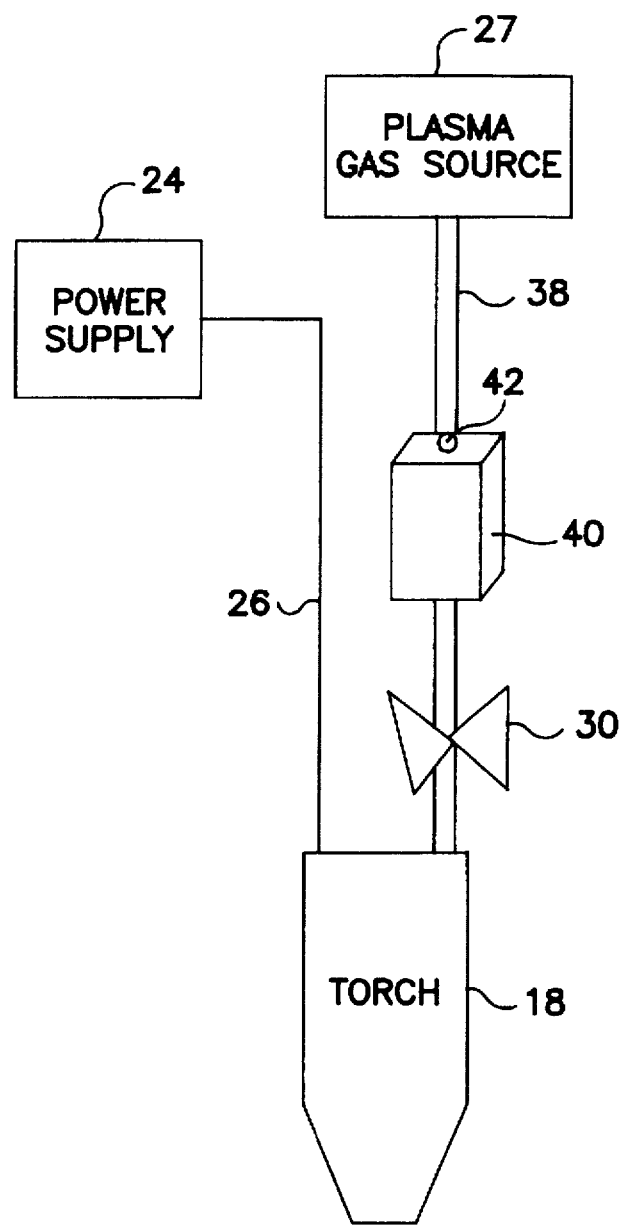
FIG. 8 is a schematic diagram of another embodiment of the plasma arc torch apparatus of the present invention.

FIG. 8 shows yet another embodiment of the plasma arc torch apparatus of the present invention. The torch 18 generally includes an electrode and a nozzle (not shown) as described above, and is electrically coupled to a power supply 24 via electrical cable 26. In this embodiment, like the embodiment of FIG. 4, the plasma gas source 27 is in fluid communication with the torch 18 via a relatively shortened fluid line 38. Disposed in the fluid line 38 is a flow restriction member 40, which, as described above, is a member having an orifice 42 that is generally of a smaller diameter than the internal passageway (not shown) defined in the fluid line 38. The flow restriction member 40 as described above, delivers gas to the torch such that the pressure therein increases gradually. Emanating further down the fluid line 38 is a two-way valve 30, which alternates between an open position during which plasma gas flows through the fluid line 38 to the torch 18, and a closed position, during which the gases in the torch 18 slowly dissipate through the nozzle orifice.

In the embodiment of FIG. 8, the voltage and pressure curves are substantially similar to the graphs of FIG. 3A and FIG. 3B, as the flow restriction member 40 provides a gradual increase in the pressure in the torch between times $t_1$ and $t_3$, and the two-way valve provides a slow dissipation of gases in the torch between times $t_4$ and $t_5$. This embodiment can be used where a short cycle length is not a critical design consideration, and slower dissipation of gases through the nozzle orifice is easily accommodated or even desirable.

Equivalents

While the invention has been particularly shown and described with reference to the preferred embodiments, it should be understood by those skilled in the art that various changes in form and detail may be made therein without departing from the spirit and scope of the invention as defined by the appended claims.

We claim:

1. A plasma arc torch apparatus comprising:
   a plasma arc torch for cutting or marking a workpiece;
   a power supply electrically coupled to the torch providing power to the torch;
   a plasma gas source;
   a fluid line connecting the source to the torch;
   a valve disposed within the fluid line adjacent the torch having an open position allowing plasma gas to flow from the source to the torch; and
   a flow restriction member disposed in the fluid line between the source and the valve, the flow restriction member regulating the flow of plasma gas to the torch resulting in a gradual increase in the pressure of the plasma gas flowing into the torch to form a stable plasma arc.

2. The plasma arc torch apparatus according to claim 1, wherein the valve further includes a vent position for venting the gas in the torch to the atmosphere, causing a rapid reduction in the pressure of gas within the torch.

3. The plasma arc torch apparatus according to claim 1, wherein the valve is a three-way valve including an inlet in fluid communication with the source, a first outlet in fluid communication with the torch, and a second outlet in fluid communication with the atmosphere, and wherein (i) the inlet is in fluid communication with the first outlet when the valve is in the open position, and (ii) the first outlet is in fluid communication with the second outlet when the valve is in the vent position.

4. The plasma arc torch apparatus according to claim 1, wherein the three-way valve is an electrically actuated solenoid valve.

5. The plasma arc torch apparatus according to claim 1, wherein the flow restriction member defines an orifice.

6. The plasma arc torch apparatus according to claim 1, wherein the torch is a contact-start plasma arc torch.

7. A method for starting a plasma arc torch, comprising:
   providing a plasma arc torch in fluid communication with a plasma source via a fluid line, and a power supply in electrical communication with the torch for delivering power to the torch;
   positioning a valve in the fluid line adjacent the source, the valve having an open position for allowing plasma gas to flow from the source to the torch;
   positioning a flow restriction member in the fluid line between the valve and the source for regulating the flow of plasma gas; and
   directing the plasma gas through the fluid line, the flow restriction member and the valve, resulting in a gradual increase in the pressure of the plasma gas flowing into the torch to form a stable plasma arc.

8. The method of claim 7, further comprising:
configuring the valve to a venting position for venting the gas in the torch to atmosphere, causing a rapid reduction in the gas pressure in the torch.

9. The method of claim 7, further comprising:
providing a three-way valve having an inlet in fluid communication with the source, a first outlet in fluid communication with the torch, and a second outlet in fluid communication with the atmosphere;
configuring the valve in the open position by placing the inlet in fluid communication with the first outlet; and
configuring the valve in the vent position by placing the first outlet in fluid communication with the second outlet.

10. The method of claim 7, wherein the torch is a contact-start plasma arc torch.

11. A plasma arc torch apparatus for cutting or marking a workpiece comprising:
a plasma arc torch having a torch body, and an electrode and a nozzle mounted at an end of the torch body;
a plasma gas source;
a fluid line providing a fluid communication path between the source and the torch;
a three-way valve disposed in the fluid line adjacent the torch, the three-way valve comprising an inlet, a first outlet, and a second outlet, the inlet being in fluid communication with the first outlet for providing plasma gas to the torch when the valve is in the open position, and the first outlet being in fluid communication with the second outlet for rapidly reducing the gas pressure in the torch when the valve is in the vent position; and
a power supply electrically coupled to the torch providing power to the torch to form a plasma arc between the nozzle and the electrode when the valve is in the open position.

12. The plasma arc torch apparatus according to clam 11, further comprising:
a flow restriction member disposed in the fluid line between the source and the three-way valve for regulating the flow of plasma gas to the torch when the three-way valve is in the open position, thereby resulting in a gradual increase in the pressure of the plasma gas flowing into the torch to form a stable plasma arc.

13. The plasma arc torch apparatus according to claim 12, where in the flow restriction member defines an orifice.

14. The plasma arc torch apparatus according to claim 12, wherein the three-way valve is an electrically actuated solenoid valve.

15. The plasma arc torch apparatus according to claim 11, wherein the torch is a contact-start plasma arc torch.

16. A method of operating a plasma arc torch, comprising:
providing a plasma arc torch in fluid communication with a plasma source via a fluid line;
positioning a three-way valve having an inlet, a first outlet, and a second outlet in the fluid line adjacent the torch;
configuring the valve in an open position by connecting the inlet and the first outlet;
delivering plasma gas from the source to the torch via the fluid line, and electrical power to the torch via a power supply to form a plasma arc; and
configuring the valve to a vent position by connecting the first outlet and the second outlet, thereby causing a rapid reduction of the gas pressure in the torch.

17. The method of claim 16, further comprising:
positioning a flow restriction member in the fluid line between the source and the three-way valve for regulating the pressure of the plasma gas flowing into the torch.

18. The method of claim 16, further comprising
alternating the three-way valve between the open position and the vent position to repeatedly form a plasma arc.

19. A method of starting a plasma arc torch having a torch body, and an electrode and a nozzle mounted at one end of the torch body, the method comprising:
connecting a plasma gas source with the plasma arc torch via a fluid line;
providing electrical power to the torch for forming a plasma arc;
positioning a three-way valve in the fluid line adjacent the torch, the valve having an open position for delivering plasma gas to the torch, and a vent position for venting gas in the torch to atmosphere;
positioning a flow restriction member in the fluid line between the source and the three-way valve for regulating the pressure of the plasma gas flowing into the torch during starting of the torch;
configuring the valve in the open position;
delivering plasma gas from the source to the torch via the fluid line, the flow restriction member and the valve to form a stable plasma arc;
terminating the electrical power to the source for extinguishing the arc; and
configuring the three-way valve from the open position to the vent position to rapidly reduce gas pressure in the torch.

20. The method of claim 19, the delivering step further comprising:
reconfiguring the three-way valve to the open position from the vent position;
providing electrical power to the torch; and
delivering plasma gas from the source to the torch via the fluid line, the flow restriction member and the valve, to re-form a stable plasma arc.

* * * * *